(12) United States Patent
Geveci et al.

(10) Patent No.: US 8,834,821 B2
(45) Date of Patent: Sep. 16, 2014

(54) CONTROL TECHNIQUES FOR AN SCR AFTERTREATMENT SYSTEM (71) Applicant: Cummins Inc., Columbus, IN (US)

(72) Inventors: Mert Geveci, Delmar, NY (US);
Andrew Osburn, Nashville, IN (US);
Michael Haas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/069,639

(22) Filed: Nov. 1, 2013

(65) Prior Publication Data

US 2014/0056790 A1 Feb. 27, 2014

Related U.S. Application Data (63) Continuation of application No. PCT/US2012/036392, filed on May 3, 2012.

(60) Provisional application No. 61/481,939, filed on May 3, 2011.

(51) Int. Cl.
*B01D 53/94* (2006.01)
*F01N 3/18* (2006.01)
*F01N 3/20* (2006.01)
*G05B 19/00* (2006.01)
*F01N 9/00* (2006.01)

(52) U.S. Cl.
CPC ..... *B01D 53/9495* (2013.01); *F01N 2900/1402* (2013.01); *F01N 2560/026* (2013.01); *Y02T 10/47* (2013.01); *Y02T 10/24* (2013.01); *F01N 2900/1806* (2013.01); *F01N 3/208* (2013.01); *F01N 9/00* (2013.01)
USPC ...... 423/213.2; 423/239.1; 422/105; 422/108; 422/111; 60/274; 60/276; 60/299; 60/301

(58) Field of Classification Search
CPC ............. F01N 3/208; F01N 2560/026; F01N 2900/1402; F01N 2900/1622; Y02T 10/24; B01D 53/9418
USPC ........... 423/213.2, 239.1; 422/105, 108, 111; 60/274, 276, 299, 301
See application file for complete search history.

(56) References Cited

U.S. PATENT DOCUMENTS 4,963,332 A 10/1990 Brand et al.
5,555,725 A 9/1996 Shimasaki et al.
(Continued)

OTHER PUBLICATIONS

SCR Committee, Selective Catalytic Reduction (SCR) Control of NOx Emissions, Institute for Clear Air (White Paper,1997), pp. 1-34.

(Continued)

*Primary Examiner* — Timothy Vanoy
(74) *Attorney, Agent, or Firm* — Krieg DeVault LLP (57) ABSTRACT A method includes providing: a selective catalytic reduction (SCR) catalyst disposed in an exhaust gas stream of an internal combustion engine, a reagent injector operationally coupled to the exhaust gas stream at a position upstream of the SCR catalyst, and a $NO_x$ sensor coupled to the exhaust gas stream at a position downstream of at least a first portion of the SCR catalyst. The method includes operating an extremum seeking controller to determine a first reagent injection amount corresponding to a predetermined slope of $\delta NO_x/\delta ANR$, the $\delta NO_x/\delta ANR$ determined according to the $NO_x$ sensor, providing a reagent injection command in response to the first reagent injection amount, and injecting an amount of the reagent in response to the reagent injection command.

23 Claims, 5 Drawing Sheets (56) References Cited

U.S. PATENT DOCUMENTS

| | | |
|---|---|---|
| 5,645,745 A | 7/1997 | Hartwick et al. |
| 5,746,053 A | 5/1998 | Hibbino |
| 6,904,751 B2 | 6/2005 | Makki et al. |
| 7,168,243 B2 | 1/2007 | Endicott et al. |
| 7,428,809 B2 | 9/2008 | Wickert et al. |
| 2005/0282285 A1 | 12/2005 | Radhamohan et al. |
| 2007/0137181 A1 | 6/2007 | Upadhyay et al. |
| 2008/0250774 A1 | 10/2008 | Solbrig |
| 2009/0185954 A1 | 7/2009 | Qi |
| 2010/0024393 A1* | 2/2010 | Chi et al. ............... 60/276 |
| 2010/0139257 A1 | 6/2010 | Driscoll |

OTHER PUBLICATIONS

Schmitt, Selective Catalytic Reduction: Testing, Numeric Modeling, and Control Strategies, available at http://digtool.livrary.colostate, edu///exlivris/dtl/d3__1/apache__media/L2V4bGlimizi__2R0bC9kM18xLFwYV9tZERpYS84Mjk4Ng==.pdf online on Jul. 7, 2012, Presented on Mar. 4, 2010.

Search Report and Written Opinion, PCT/US2012/036392/ ISA/US, dated Jul. 17, 2012, 11 pgs.

* cited by examiner

CONTROL TECHNIQUES FOR AN SCR AFTERTREATMENT SYSTEM

CROSS-REFERENCE TO RELATED APPLICATIONS

This application is a continuation of International Application No. PCT/US2012/036392 filed on May 3, 2012, which claims the benefit of the filing date of U.S. Provisional Application No. 61/481,939 filed on May 3, 2011, each of which is entitled CONTROL TECHNIQUES FOR AN SCR AFTERTREATMENT SYSTEM, and each of which is incorporated herein by reference in the entirety for all purposes.

BACKGROUND

The technical field generally relates to control of selective catalytic reduction (SCR) aftertreatment systems for internal combustion engines. SCR systems present several control challenges for internal combustion engine applications, including for mobile applications. SCR systems include a reduction catalyst and a reducing agent, such as urea or ammonia.

An injector provides the reducing agent to the exhaust stream at a position upstream of the SCR catalyst, and the reducing agent enters the gas phase of the exhaust stream as ammonia. A delay sometimes occurs between the introduction of the reducing agent and the availability of the reductant product, for example injected particles of the reducing agent may need to evaporate into the exhaust stream, hydrolyze from urea to ammonia, and/or thoroughly mix into the exhaust stream for general availability across the SCR catalyst. Additionally, the SCR catalyst may include some ammonia storage capacity. Storage capacity can complicate the controls process, for example by creating additional controls targets (e.g. a storage target), by releasing ammonia unexpectedly (e.g. when a system condition causes a decrease in storage capacity), and/or by adsorbing some of the injected ammonia in an early part of the catalyst thereby reducing the availability of ammonia at a rear portion of the catalyst during catalyst filling operating periods.

The challenges presented by presently available SCR systems are exacerbated by the transient nature of mobile applications. The engine load and speed profile varies during operations in a manner that is determined by an operator and generally not known in advance to the SCR control system. Additionally, available feedback systems suffer from several drawbacks. For example, the concentration of ammonia is difficult to determine in real time. Commercially reasonable ammonia sensors often suffer from cross-sensitivity with $NO_x$, complicating the determination of the amount of ammonia present. Further, ammonia is generally an undesirable constituent of the final exhaust emissions, and further emitted ammonia represents ineffectively utilized reductant that increases operating costs. Therefore it is desirable to operate at a very low or zero ammonia concentration at the SCR catalyst outlet. Ammonia levels at the SCR outlet in many applications are below the reliable level of commercially reasonable sensor detection, especially in aging or marginal ammonia sensors.

SUMMARY

One embodiment is a unique method for controlling an SCR aftertreatment system. Other embodiments include unique methods, systems, and apparatus to minimize a $NO_x$ sensor output, to operate an SCR aftertreatment system at an operating point offset from the minimum point, and/or to control an SCR aftertreatment system at a $\delta$-$NO_x$/$\delta$ANR value. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
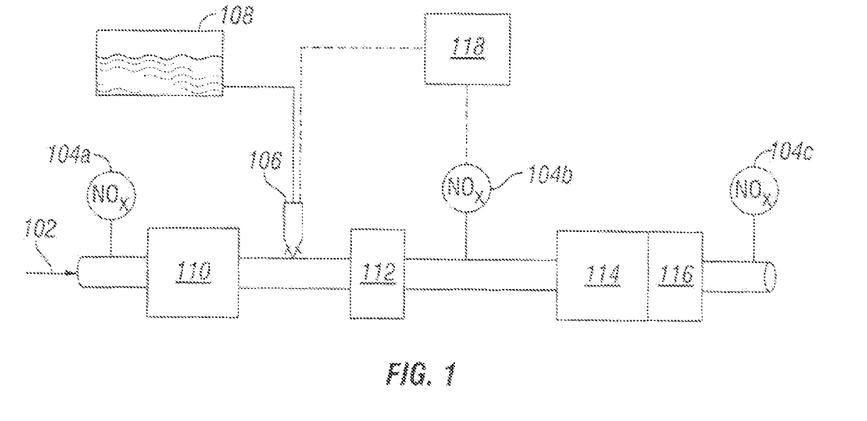
FIG. 1 is a schematic diagram of a system for operating an SCR catalyst to reduce $NO_x$ emissions of an engine.

Referencing FIG. 1, a system 100 includes an exhaust flow 102 from an internal combustion engine, the exhaust flow 102 including an amount of $NO_x$. The system 100 includes a first $NO_x$ sensor 104a that is an optional $NO_x$ sensor to provide an estimate of engine-out $NO_x$. The engine-out $NO_x$ may alternatively be determined by a model or a sensor positioned at a different location in the system. The system 100 includes an upstream aftertreatment component 110, that may be an oxidation catalyst, a particulate filter, or both. In certain embodiments, the upstream $NO_x$ sensor 104a is positioned without any oxidation catalyst between the sensor 104a and a first SCR catalyst 112.

The system 100 includes a reductant injector 106 fluidly coupled to a reductant injector source 108. The reductant injector 106 injects urea, $NH_3$, or other $NH_3$ producing constituent. The system 100 includes the first SCR catalyst 112 and the second SCR catalyst 114, with a second $NO_x$ sensor 104b positioned therebetween. In the illustrated example, the first SCR catalyst 112 is smaller than the second SCR catalyst 114, providing for most of the SCR based $NO_x$ reduction capacity of the system 100 to be downstream of the second $NO_x$ sensor 104b. The ratio of the first SCR catalyst 112 to the second SCR catalyst 114 is selectable to any value, including at least values from 1:9 to 9:1, and 1:4 to 4:1, although values outside these ranges are also contemplated herein. The only requirement in the sizes of the catalyst ranges are, during periods wherein an operating slope 304 (reference FIG. 3 and the referencing description) is being determined, the first SCR catalyst 112 includes sufficient catalyst material to reduce a statistically significant amount of $NO_x$ to $N_2$ compared to the precision of the sensor 104b. In certain embodiments, the second SCR catalyst 114 is sufficiently sized to reduce a statistically significant amount of $NO_x$ to $N_2$ compared to the precision of the sensor 104b or the sensor 104c, although typically the second SCR catalyst 114 will include half or more of the total SCR catalyst mass.

The system 100 further includes an optional $NH_3$ oxidation (AMOX) catalyst 116, provided to oxidize at least a portion of the slipping NH3 from the second SCR catalyst 114 during at least some operating conditions. The AMOX 116 may be presented as a discrete catalytic element, in the same or a different housing from the second SCR catalyst 114, and may be included as a washcoat on a portion (specifically a rear portion) of the second SCR catalyst 114. The first SCR catalyst 112 and the second SCR catalyst 114 may be located in the same or a different housing. Additional SCR catalyst elements may be present, and are schematically included with the second SCR catalyst 114 herein.

The system 100 further includes a controller 118. The controller 118 may form a portion of a processing subsystem, and may include functional elements in software and/or hardware. The controller 118 may be a single device or more than one distributed devices. The controller 118 may have modules structured to functionally execute any operations of any method or procedure described herein.

An exemplary method includes providing a selective catalytic reduction (SCR) catalyst disposed in an exhaust gas stream of an internal combustion engine, and a reagent injector operationally coupled to the exhaust gas stream at a position upstream of the SCR catalyst. The method includes providing a $NO_x$ sensor coupled to the exhaust gas stream at a position downstream of a first portion of the SCR catalyst and upstream of a second portion of the SCR catalyst. The $NO_x$ sensor may be provided at a mid-bed location between the first and second SCR catalysts. The mid-bed location is a location between two SCR catalyst elements, or a position within a single SCR catalyst element that includes some of the SCR catalyst mass upstream and some of the SCR catalyst mass downstream. The first and second SCR catalysts may be within the same housing or be provided within separate housings.

Figure 2:
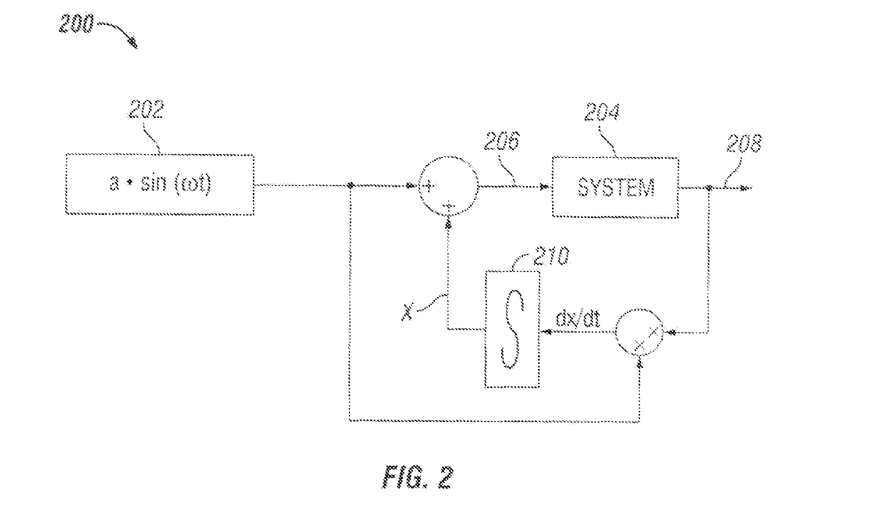
FIG. 2 is a schematic diagram of a control loop for operating an SCR catalyst to reduce $NO_x$ emissions of an engine.

The method includes operating an extremum seeking algorithm to determine a first reagent injection amount corresponding to a minimum apparent $NO_x$ measurement from the $NO_x$ sensor. Referencing FIG. 2, an exemplary extremum seeking algorithm is illustrated, with a perturbation (or dithering) operation 202 that perturbs an inlet command parameter (e.g. the reductant injection rate), adds the perturbation term to a current estimate of the optimal parameter (x) to generate an input command 206, and measures the resulting output 208 after the system 204 operates on the input 206. The utilization of the integrator 210 attenuates high frequency dynamics from the output 208. In certain embodiments, a low-pass filter or other high frequency attenuation may be utilized. The exemplary extremum controller 200 in FIG. 2 is illustrative and non-limiting, and any extremum seeking controller, or other algorithm that provides a convergence of the $NO_x$ measurement from the $NO_x$ sensor to a minimum value is contemplated herein.

The method includes providing a reagent injection command in response to the first reagent injection amount. The provided reagent injection command may be the first reagent injection amount that is found to minimize the $NO_x$ measurement. Alternatively, the reagent injection command may be a command having an ANR value that is offset (e.g. higher or lower) than the ANR value associated with the first reagent injection amount. Alternatively or additionally, the reagent injection command may be a command having an ANR value that is a multiple of the ANR value associated with the first reagent injection amount.

Figure 3:
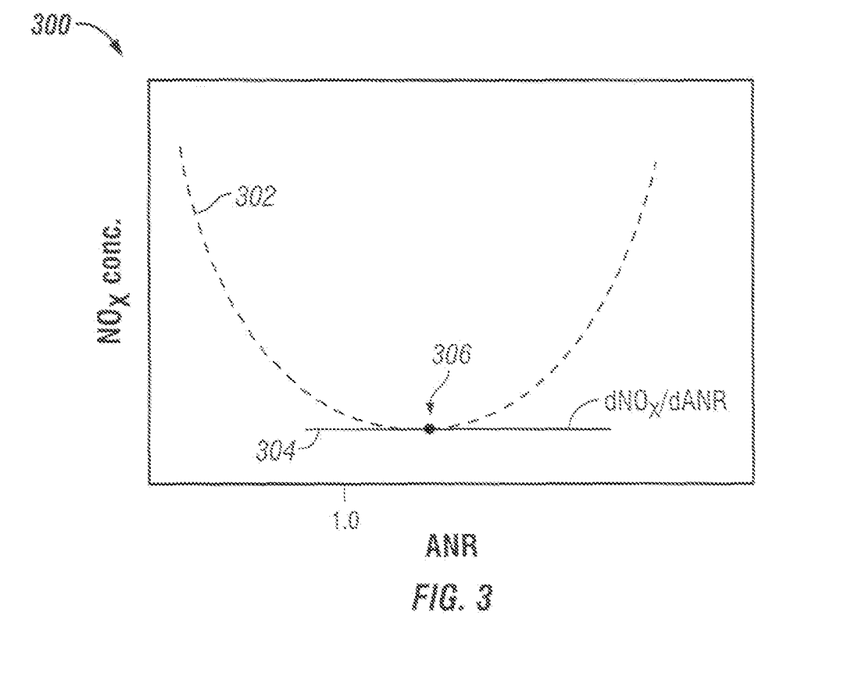
FIG. 3 is an illustration of a $NO_x$ concentration response to an ammonia-to-$NO_x$ ratio in an exhaust gas stream.

For example, referencing FIG. 3, illustrative data 300 including an operating curve 302 of the ANR versus the $NO_x$ measurement of the $NO_x$ sensor is shown for a particular set of conditions. The curve 302 includes a minimum $NO_x$ measurement 306, illustrated in the example at an ANR value of greater than 1, in the region of 1.15. One of skill in the art will recognize that any change in the system conditions, including a temperature of the SCR catalyst, an amount of $NO_x$ being emitted by the engine, an amount of $NH_3$ presently stored on the SCR catalyst, an exhaust flow rate through the SCR catalyst, or other factors, will change the operating curve 302 and the point of the minimum 306 on the curve. At the point 306 where the minimum occurs, a slope 304 of $\delta$-$NO_x$/$\delta$-ANR is shown and is zero. Exemplary operations include determining the minimum 306 at the present operating conditions utilizing an extremum seeking controller, and injecting reductant at the ANR of the minimum 306, injecting at an offset ANR from the minimum (e.g. 1.2 rather than 1.15, or 1.05 rather than 1.15), and/or injecting at a multiple ANR of the minimum 306 ANR (e.g. between 0.95× and 1.25× the minimum 306).

The method includes injecting an amount of the reagent in response to the reagent injection command.

In certain embodiments, the method includes dithering (or perturbing) an input term of the controller. The dithering may be performed continuously or periodically. For example, where the dithering is performed continuously, the controller continuously perturbs the input term (e.g. the reductant injection rate), and checks for the minimum 306 on the operating curve 302, or for operation at a predetermined slope 304 value of the operating curve 302. Where the dithering is performed periodically, the minimum 306 or predetermined slope 304 value along the operating curve 302 is determined for the present operating conditions, and the reductant injection rate determined thereby is utilized for a period of time before perturbation is resumed to check the operating point again. The period of time may be related to a period of time during which catalyst degradation may occur, the period of time may be determined to expire in response to a catalyst $NH_3$ storage level change (e.g. the catalyst has emptied or filled with $NH_3$ since the perturbation check), and/or the period of time may be determined to expire in response to operating condition changes that have changed or introduced the risk of changing the operating curve 302. The dithering of the input term may be performed using an oscillating or varying function of any type, including utilizing an oscillating trigonometric function.

In certain embodiments, the amplitude of the dithering is limited, for example based upon an amount of reagent that would be required to react with all of the engine emitted $NO_x$. An exemplary dithering amplitude includes dithering with an amplitude of less than 25% of a stoichiometric reagent amount, and/or dithering with an amplitude of less than 10% of a stoichiometric reagent amount. In certain embodiments, the method includes continuously dithering the input term utilizing a differentiable function. In certain embodiments, the operations of the extremum controller are not suspended for invasive testing.

In certain embodiments, the second portion of the SCR catalyst includes a majority of the SCR catalyst. The majority of the SCR catalyst can include at least three-fourths of the SCR catalyst, although a smaller fraction of the SCR catalyst may be provided in the second portion. The utilization of a smaller amount of catalyst in the first portion of the SCR catalyst provides for a more responsive control system, and for a more accurate determination of the minimum 306 operating point or of the slope 304. The utilization of a larger amount of catalyst in the first portion of the SCR catalyst provides for feedback control on a greater portion of the SCR catalyst, and is therefore more robust to disturbances such as uneven degradation of the first and second portions of the SCR catalyst, or uneven $NO_x$ reduction performance of the first and second SCR catalysts. One of skill in the art contemplating a particular system and having the benefit of the disclosures herein can determine appropriate fractions for the first portion and second portion of the SCR catalyst.

In certain embodiments, the first reagent injection amount corresponds to a first ANR, and the method includes providing the reagent injection command by determining a second ANR that is offset from the first ANR and providing the reagent injection command to achieve the second ANR. The second ANR may be lower or higher than the first ANR. The exemplary method further includes determining the second ANR by determining an ANR lower than the first ANR that still provides an apparent $NO_x$ measurement that is lower than a threshold apparent $NO_x$ measurement. The threshold apparent $NO_x$ measurement may be an emissions limit or other selected $NO_x$ limit.

An exemplary method includes providing the second ANR that is lower than the first ANR, where an increasing ANR from the second ANR has a δ-apparent $NO_x$/δ-ANR (i.e. operating slope 304 on FIG. 3) that is below a first threshold value and that decreasing ANR from the second ANR has a δ-apparent $NO_x$/δ-ANR that is above a second threshold value. Another exemplary method includes providing the second ANR that is lower than the first ANR, where an increasing ANR from the second ANR has a δ-apparent $NO_x$/δ-ANR that is above a first threshold value and that decreasing ANR from the second ANR has a δ-apparent $NO_x$/δ-ANR that is below a second threshold value. Another exemplary embodiment includes providing the second ANR that is lower than the first ANR, where a δ-apparent $NO_x$/δ-ANR at the second ANR is within a third threshold value of a target δ-apparent $NO_x$/δ-ANR (i.e. the slope 304 at the second ANR is within the third threshold value of a target slope 304).

Another exemplary method includes providing a selective catalytic reduction (SCR) catalyst disposed in an exhaust gas stream of an internal combustion engine, and a reagent injector operationally coupled to the exhaust gas stream at a position upstream of the SCR catalyst. The method further includes providing a $NO_x$ sensor coupled to the exhaust gas stream at a position downstream of at least a first portion of the SCR catalyst, and operating an extremum seeking controller to determine a first reagent injection amount corresponding to a predetermined slope of δ$NO_x$/δANR, the δ$NO_x$/δANR determined according to the $NO_x$ sensor. The extremum seeking controller may be a slope seeking controller, and/or the extremum seeking controller may be a controller seeking a minimum of an error value, where the error value is determined as a difference between the predetermined slope of δ$NO_x$/δANR and a presently observed slope 304 of a current operating point.

The method further includes providing a reagent injection command in response to the first reagent injection amount, and injecting an amount of the reagent in response to the reagent injection command.

Figure 4:
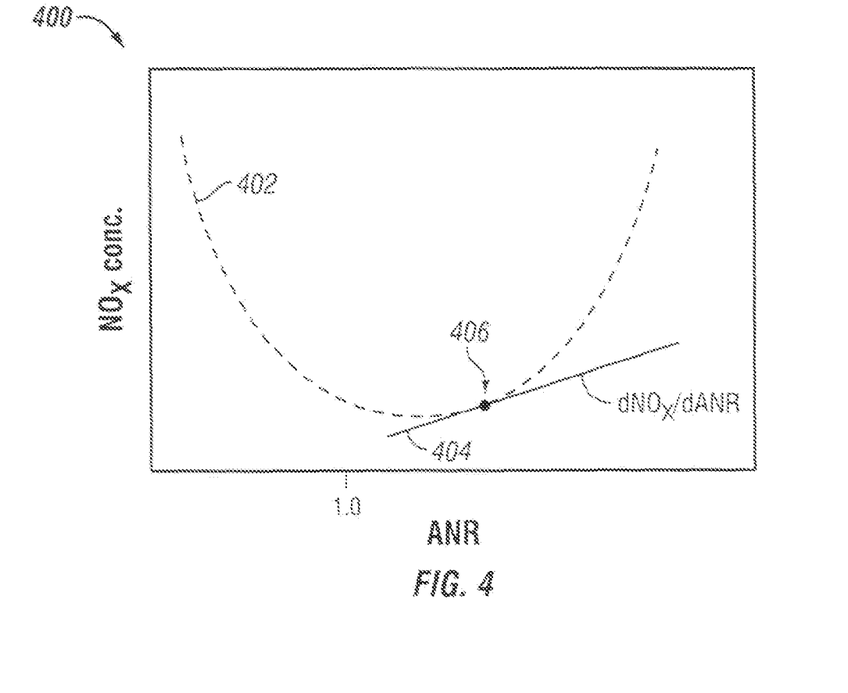
FIG. 4 is a second illustration of a $NO_x$ concentration response to an ammonia-to-$NO_x$ ratio in an exhaust gas stream.
Figure 5:
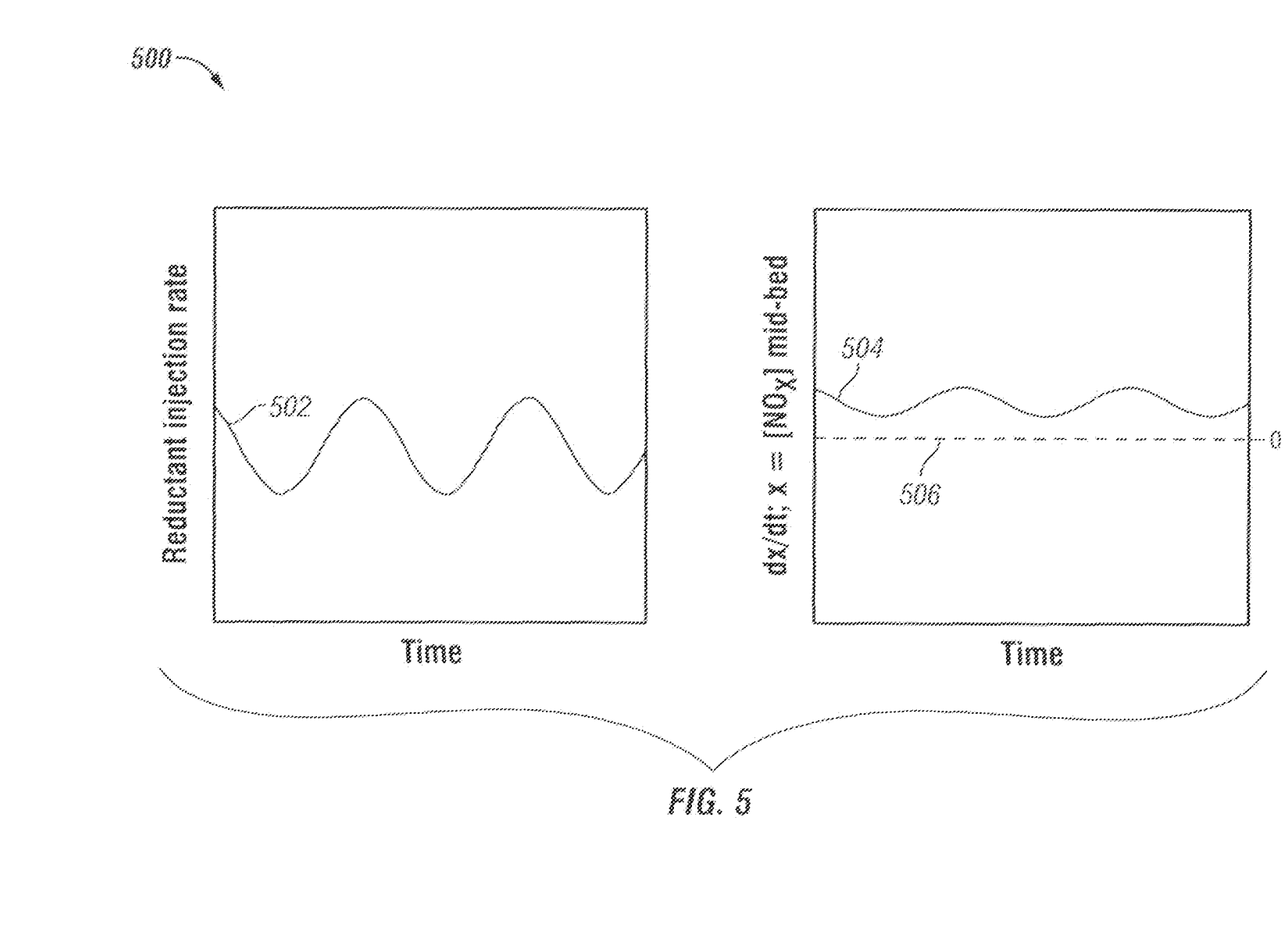
FIG. 5 is an illustration of reductant injection and a $NO_x$-ANR slope plotted over time.

Referencing FIG. 4, illustrative data 400 is shown with an operating curve 402, an operating point 406, and a slope 404 at the operating point 406. Where the slope 404 is the predetermined slope, the system in FIG. 4 is operating at the designed operating point. Referencing FIG. 5, a controller dithers the reductant injection rate versus time on curve 502. The actual mid-bed $NO_x$ observed is shown on the curve 504, which will be dampened somewhat from the reductant injection rate curve 502 due to system dynamics. The curve 504 will also be slightly phase-shifted behind curve 502, but this effect is not illustrated to simplify the example. A slope 506 of zero is illustrated in FIG. 5, showing that the curve 504 is operating in pseudo-steady state at small positive slope value. The data in FIG. 5 is consistent with a system operating on curve 402 (see FIG. 4) near the operating point 406, with some movement back and forth on the curve 402 due to the control dithering, and to the right of the minimum.

Figure 6:
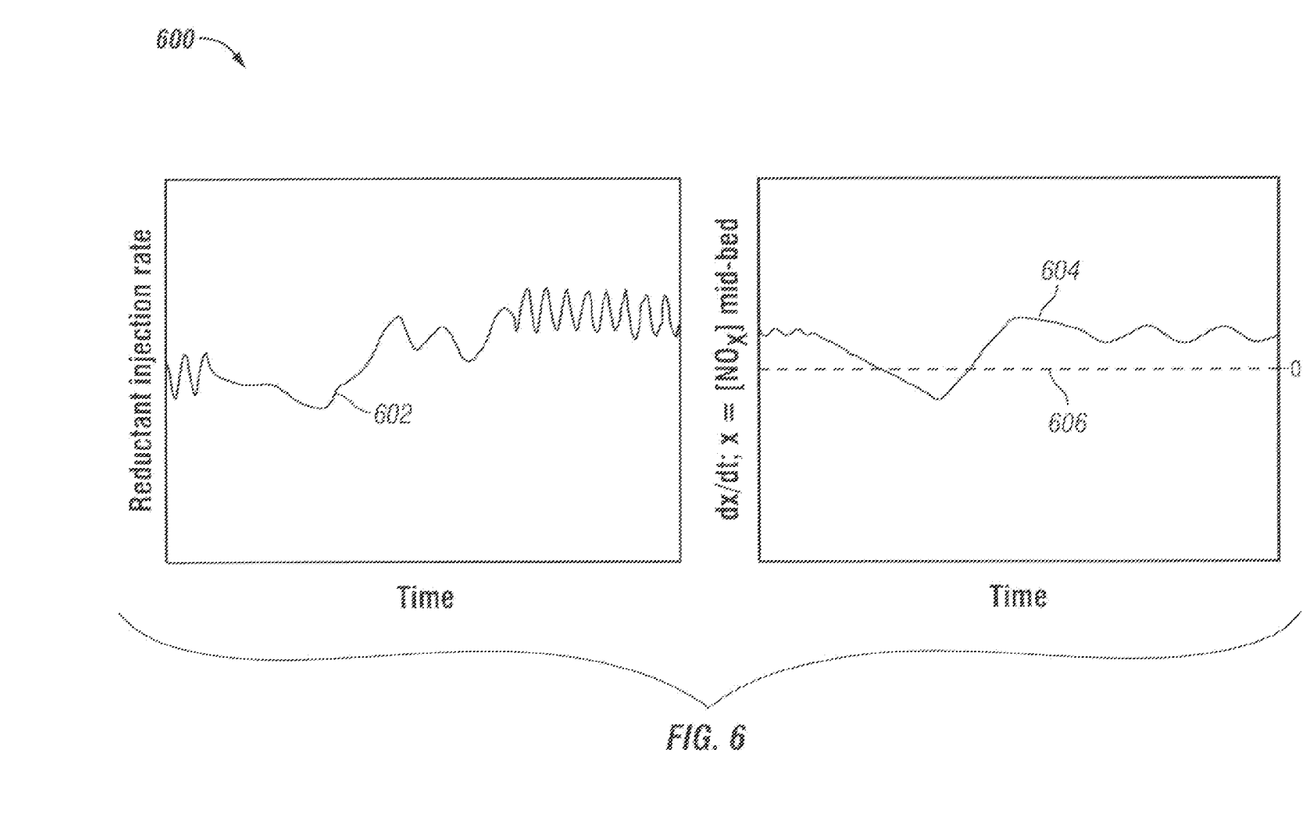
FIG. 6 is a second illustration of reductant injection and a $NO_x$-ANR slope plotted over time.

Referencing FIG. 6, a system response is illustrated where external disturbances are introduced. The data 600 in FIG. 6 is illustrative and demonstrates the control response, but the type and magnitude of the disturbances are not indicative of any particular effect. After a brief period of dithering on the curve 602 and dampened oscillation on curve 604, the slope of the δ$NO_x$/δANR drops, for example due to a change in the operating curve 402 due to a temperature, $NH_3$ storage, flow rate, or other system change. A rapid increase in the engine-out $NO_x$ amount would also introduce a rapid reduction in the ANR which could introduce the drop in the δ$NO_x$/δANR. The controller responds on curve 602 with an increase in reductant injection rate. The control response is less oscillatory during the change in the example, due to the feedforward $NO_x$ control algorithm inducing a rapid change in the reductant injection amount (e.g. in response to a rapid engine-out $NO_x$ increase). As the curve 604 returns to the predetermined slope value, the oscillatory character of the control curve 602 returns. The control curves in FIGS. 5 and 6 are shown to be oscillating throughout the illustrated time segment, but the oscillation may be periodic, continuous, intermittent, or performed in response to certain triggering criteria as otherwise explained herein.

An example system includes a processing subsystem having a controller 118 structured to functionally execute certain operations to control an SCR aftertreatment system. The controller 118 form a portion of a processing subsystem, and may include functional elements in software and/or hardware. The controller 118 may be a single device or more than one distributed devices. The controller 118 may have modules structured to functionally execute any operations of any method or procedure described herein.

In certain embodiments, the controller 118 includes one or more modules structured to functionally execute the operations of the controller 118. Referencing FIG. 7, an example processing subsystem 700 includes a controller 118 having a $NO_x$ determination module 702, a dithering module 704, and a reagent targeting module 706. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 118 may be a part of a system including a selective catalytic reduction (SCR) portion and a $NO_x$ sensor operationally coupled to an internal combustion engine exhaust at a position downstream of the SCR portion. The SCR portion includes any fraction of an SCR catalyst amount in the system, including the full SCR catalyst amount. In certain embodiments, the SCR portion is an upstream fraction of at least two SCR portions, and may be provided in a separate housing or the same housing as a downstream portion. Additionally or alternatively, the SCR portion and a downstream SCR portion may be physically part of the same catalyst substrate, with the $NO_x$ sensor provided at a mid-location in the catalyst substrate. The $NO_x$ sensor providing a $NO_x$ measurement, which may be an output value of the $NO_x$ sensor, a measurement of $NO_x$ in the exhaust stream, and/or an apparent measurement of $NO_x$, for example combined with any apparent $NO_x$ due to cross-sensitivity to and presence of ammonia in the exhaust stream at the $NO_x$ sensor.

Figure 7:
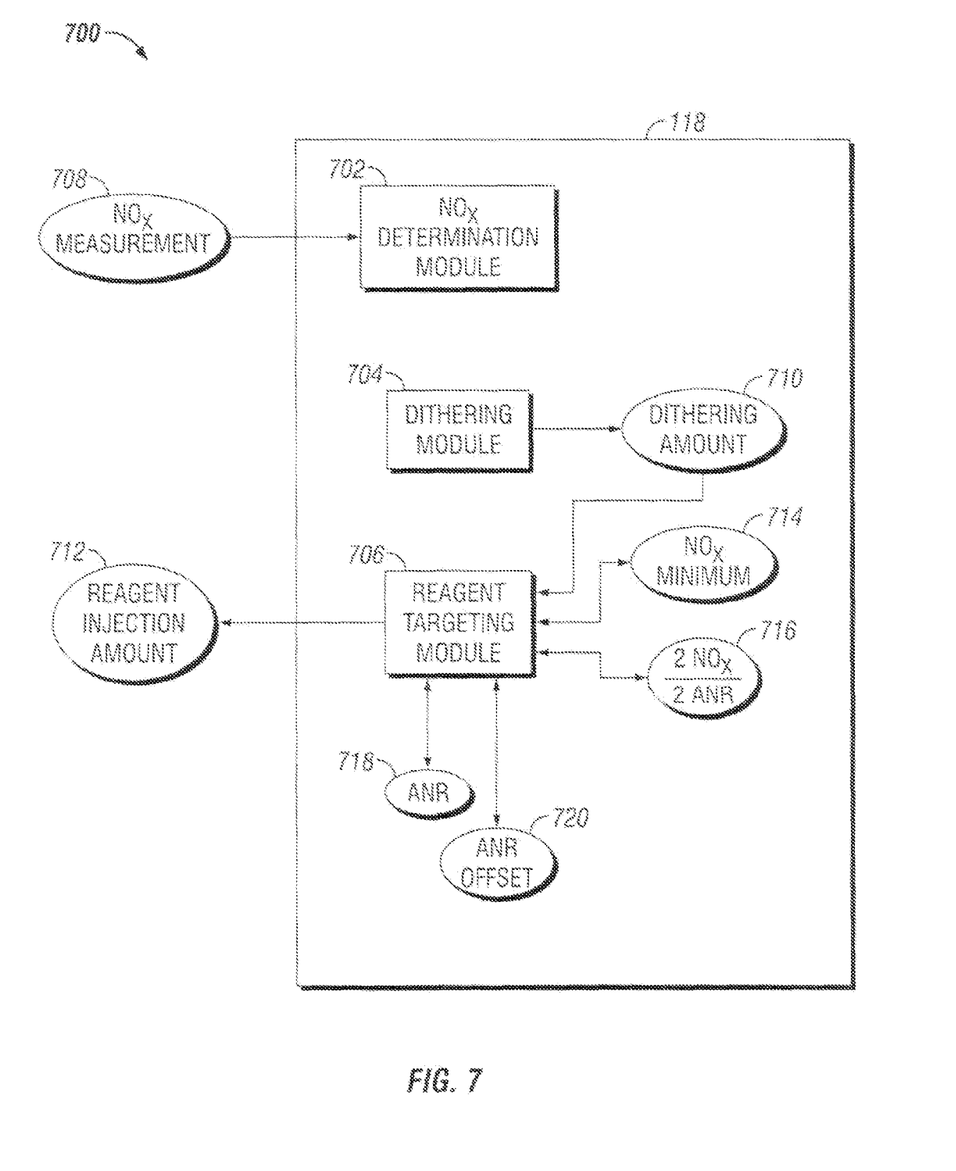
FIG. 7 is a schematic diagram of a processing subsystem for operating an SCR catalyst.

The controller 118 includes a $NO_x$ determination module 702 that interprets the $NO_x$ measurement. The controller 118 further includes a dithering module 704 that provides a dithering value which includes a reagent target adjustment. The dithering value is a value that varies a reagent injection amount 712, including a value that is dithered and converted elsewhere in the system to adjust a command for a reagent injector. The dithering of the reagent injection amount 712 determines a minimum NOx operating point in terms of ANR (e.g. reference FIG. 3 and the referencing description), determines an ANR value or range of values that provide a NOx amount that is lower than a threshold NOx amount (e.g. through determination of specific operating points on a curve 302), and/or determines one or more slope values of $\delta NO_x/\delta ANR$. The determination of one or more slope values $\delta NO_x/\delta ANR$ can be utilized to provide a robust minimum NOx ANR (e.g. near a value or range of values where $\delta NO_x/\delta ANR$ is close to zero) and/or to determine an ANR value or range of ANR values that provide an acceptably low slope value $\delta NO_x/\delta ANR$. The slope value $\delta NO_x/\delta ANR$ may be an instantaneous slope or approximation thereof (e.g. by determining a fit equation for a curve 302 and using a derivative equation) and/or by determining averaged slope value over a range of ANR values.

The operations of the dithering module 704 may be continuous and/or periodic—for example occurring continuously during all engine operating periods, operating continuously during certain engine operating periods, and/or occurring at certain intervals (e.g. once per trip, once per day, once per hour, etc.)

The controller 118 further includes a reagent targeting module 706 that determines a reagent injection amount 712 in response to the reagent target adjustment and the $NO_x$ measurement 708. Example and non-limiting reagent target adjustments include an ANR target 718, an ANR offset 720, an ANR corresponding to a target $\delta NO_x/\delta ANR$ value 716, and/or an ANR corresponding to a $NO_x$ minimum value 714. The reagent injection amount 712 is additionally or alternatively adjusted by the dithering amount 710 during operations of the dithering module 704.

The system further includes a reagent injector responsive to the reagent injection amount 712. The reagent injector response to the reagent injection amount 712 may be any type of response understood in the art. Example and non-limiting responses of the reagent injector include targeting the reagent injection amount 712 as an injection amount, progressing toward injecting the reagent injection amount 712 (e.g. through a feedforward and/or feedback controller), and/or providing the reagent injection amount 712 into a controller accepting other competing or limiting values for injection (e.g. ammonia slip limits, SCR catalyst storage limits, current conversion efficiency limits, etc.).

As is evident from the figures and text presented above, a variety of embodiments according to the present disclosure are contemplated.

An example set of embodiments is a method including providing a selective catalytic reduction (SCR) catalyst disposed in an exhaust gas stream of an internal combustion engine, and a reagent injector operationally coupled to the exhaust gas stream at a position upstream of the SCR catalyst, providing a $NO_x$ sensor coupled to the exhaust gas stream at a position downstream of a first portion of the SCR catalyst and upstream of a second portion of the SCR catalyst, and operating an extremum seeking algorithm to determine a first reagent injection amount corresponding to a minimum apparent $NO_x$ measurement from the $NO_x$ sensor. The method further includes providing a reagent injection command in response to the first reagent injection amount, and injecting an amount of the reagent in response to the reagent injection command.

In certain further embodiments, the method additionally or alternatively includes the operating the extremum seeking algorithm including dithering an injected reagent amount, where the dithering may include scaling a feedback term by a dithering value and biasing the injected reagent amount by the dithering value. The dithering may be performed continuously, for example by utilizing an oscillating trigonometric function and/or by utilizing a differentiable function. In certain embodiments, the method includes periodically and/or intermittently performing the dithering. In certain embodiments, the dithering includes an amplitude of up to 25% of a stoichiometric reagent amount, or an amplitude of up to 10% of the stoichiometric reagent amount. An example methods includes operating the extremum controller without pauses for invasive testing.

In certain embodiments, the second portion of the SCR catalyst includes a majority of the SCR catalyst, and may further include at least three-fourths of the SCR catalyst. In certain embodiments, the first reagent injection amount corresponds to a first ammonia to $NO_x$ ratio (ANR), where providing the reagent injection command in response to the first reagent injection amount includes determining a second ANR that is offset from the first ANR, and providing the reagent injection command to achieve the second ANR. Additional or alternative embodiment include one or more of: the second ANR is lower than the first ANR by an offset amount; the determining the second ANR includes determining an ANR lower than the first ANR that provides an apparent $NO_x$ measurement that is lower than a threshold apparent $NO_x$ measurement; and/or the second ANR being an ANR lower than the first ANR such that: an increasing ANR from the second ANR has a δ-apparent $NO_x$/δ-ANR that is below a first threshold value and that decreasing ANR from the second ANR has a δ-apparent $NO_x$/δ-ANR that is above a second threshold value; an increasing ANR from the second ANR has a δ-apparent $NO_x$/δ-ANR that is above a first threshold value and that decreasing ANR from the second ANR has a δ-apparent $NO_x$/δ-ANR that is below a second threshold value; and/or a δ-apparent $NO_x$/δ-ANR at the second ANR is within a third threshold value of a target δ-apparent $NO_x$/δ-ANR.

Another example set of embodiments is a method including providing a selective catalytic reduction (SCR) catalyst disposed in an exhaust gas stream of an internal combustion engine, and a reagent injector operationally coupled to the exhaust gas stream at a position upstream of the SCR catalyst, providing a $NO_x$ sensor coupled to the exhaust gas stream at a position downstream of at least a first portion of the SCR catalyst, operating an extremum seeking controller to determine a first reagent injection amount corresponding to a predetermined slope of $\delta NO_x/\delta ANR$, the $\delta NO_x/\delta ANR$ determined according to the $NO_x$ sensor, providing a reagent injection command in response to the first reagent injection amount, and injecting an amount of the reagent in response to the reagent injection command.

In certain additional or alternative embodiments, the method includes the operating the extremum seeking algorithm including dithering the reagent injection command to confirm the current slope of $\delta NO_x/\delta t$, the predetermined slope of $\delta NO_x/\delta t$ occurring at a reagent injection command greater than an ANR of 1, and/or the predetermined slope of $\delta NO_x/\delta t$ being a positive non-zero value.

An example set of embodiments is a system including a selective catalytic reduction (SCR) portion and a $NO_x$ sensor operationally coupled to an internal combustion engine exhaust at a position downstream of the SCR portion, the $NO_x$ sensor providing a $NO_x$ measurement, a controller having a $NO_x$ determination module that interprets the $NO_x$ measurement, a dithering module that provides a dithering value including a reagent target adjustment, and a reagent targeting module that determines a reagent injection amount in response to the reagent target adjustment and the $NO_x$ measurement. The system includes a reagent injector responsive to the reagent injection amount.

In certain additional or alternative embodiments, the system includes the dithering module operating periodically, the reagent targeting module further targeting a reagent injection amount corresponding to a minimum value of the $NO_x$ measurement, and/or the SCR portion including a first SCR portion, where the system further includes a second SCR portion downstream of the $NO_x$ sensor, and where the second SCR portion is larger than the SCR portion.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
providing a selective catalytic reduction (SCR) catalyst disposed in an exhaust gas stream of an internal combustion engine, and a reagent injector operationally coupled to the exhaust gas stream at a position upstream of the SCR catalyst;
providing a $NO_x$ sensor coupled to the exhaust gas stream at a position downstream of a first portion of the SCR catalyst and upstream of a second portion of the SCR catalyst;
operating an extremum seeking algorithm to determine a first reagent injection amount corresponding to a minimum apparent $NO_x$ measurement from the $NO_x$ sensor;
providing a reagent injection command in response to the first reagent injection amount; and
injecting an amount of the reagent in response to the reagent injection command.

2. The method of claim 1, wherein the operating the extremum seeking algorithm comprises dithering an injected reagent amount.

3. The method of claim 2, wherein the dithering comprises scaling a feedback term by a dithering value and biasing the injected reagent amount by the dithering value.

4. The method of claim 2, further comprising continuously performing the dithering.

5. The method of claim 4, wherein the continuously performing the dithering comprises utilizing an oscillating trigonometric function.

6. The method of claim 2, further comprising periodically performing the dithering.

7. The method of claim 2 wherein the dithering comprises an amplitude of less than 25% of a stoichiometric reagent amount.

8. The method of claim 2, wherein the dithering comprises an amplitude of less than 10% of a stoichiometric reagent amount.

9. The method of claim 4, wherein the continuously performing the dithering comprises utilizing a differentiable function.

10. The method of claim 1, wherein the operations of the extremum controller are not suspended for invasive testing.

11. The method of claim 1, wherein the second portion of the SCR catalyst comprises a majority of the SCR catalyst.

12. The method of claim 11, wherein the second portion of the SCR catalyst further comprises at least three-fourths of the SCR catalyst.

13. The method of claim 1, wherein the first reagent injection amount corresponds to a first ammonia to $NO_x$ ratio (ANR), wherein providing the reagent injection command in response to the first reagent injection amount comprises determining a second ANR that is offset from the first ANR, and providing the reagent injection command to achieve the second ANR.

14. The method of claim 13, wherein the second ANR is lower than the first ANR by an offset amount.

15. The method of claim 13, wherein determining the second ANR comprises determining an ANR lower than the first ANR that provides an apparent $NO_x$ measurement that is lower than a threshold apparent $NO_x$ measurement.

16. The method of claim 13, wherein the second ANR comprises an ANR lower than the first ANR such that one of:
an increasing ANR from the second ANR has a δ-apparent $NO_x$/δ-ANR that is below a first threshold value and that decreasing ANR from the second ANR has a δ-apparent $NO_x$/δ-ANR that is above a second threshold value;

an increasing ANR from the second ANR has a δ-apparent $NO_x/δ$-ANR that is above a first threshold value and that decreasing ANR from the second ANR has a δ-apparent $NO_x/δ$-ANR that is below a second threshold value; and a δ-apparent $NO_x/δ$-ANR at the second ANR is within a third threshold value of a target δ-apparent $NO_x/δ$-ANR.

17. A method, comprising:
providing a selective catalytic reduction (SCR) catalyst disposed in an exhaust gas stream of an internal combustion engine, and a reagent injector operationally coupled to the exhaust gas stream at a position upstream of the SCR catalyst;
providing a $NO_x$ sensor coupled to the exhaust gas stream at a position downstream of at least a first portion of the SCR catalyst;
operating an extremum seeking controller to determine a first reagent injection amount corresponding to a predetermined slope of $δNO_x/δANR$, the $δNO_x/δANR$ determined according to the $NO_x$ sensor;
providing a reagent injection command in response to the first reagent injection amount; and
injecting an amount of the reagent in response to the reagent injection command.

18. The method of claim 17, wherein the operating the extremum seeking algorithm comprises dithering the reagent injection command to confirm the current slope of $δNO_x/δt$.

19. The method of claim 17, wherein the predetermined slope of $δNO_x/δt$ occurs at a reagent injection command greater than an ANR of 1.

20. The method of claim 17, wherein the predetermined slope of $δNO_x/δt$ is a positive non-zero value.

21. A system, comprising:
a selective catalytic reduction (SCR) portion and a $NO_x$ sensor operationally coupled to an internal combustion engine exhaust at a position downstream of the SCR portion, the $NO_x$ sensor providing a $NO_x$ measurement;
a controller, the controller comprising:
a $NO_x$ determination module structured to interpret the $NO_x$ measurement;
a dithering module structured to provide a dithering value comprising a reagent target adjustment;
a reagent targeting module structured to determine a reagent injection amount in response to the reagent target adjustment and the $NO_x$ measurement wherein the reagent targeting module is further structured to target a reagent injection amount corresponding to a minimum value of the $NO_x$ measurement; and
a reagent injector responsive to the reagent injection amount.

22. The system of claim 21, wherein the dithering module operates periodically.

23. The system of claim 21, the SCR portion comprising a first SCR portion, the system further comprising a second SCR portion downstream of the $NO_x$ sensor, wherein the second SCR portion is larger than the SCR portion.

* * * * *